United States Patent

LeBlanc et al.

(10) Patent No.: US 10,308,404 B2
(45) Date of Patent: Jun. 4, 2019

(54) SPRING-BIASED VALVE ASSEMBLY

(71) Applicant: Illinois Tool Works Inc., Glenview, IL (US)

(72) Inventors: Jonathan P. LeBlanc, Lake In The Hills, IL (US); Brendan G. Metz, Crystal Lake, IL (US); Willow L. Curtin, Crystal Lake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/555,836

(22) PCT Filed: Feb. 19, 2016

(86) PCT No.: PCT/US2016/018629
§ 371 (c)(1),
(2) Date: Sep. 5, 2017

(87) PCT Pub. No.: WO2016/144503
PCT Pub. Date: Sep. 15, 2016

(65) Prior Publication Data
US 2018/0037378 A1 Feb. 8, 2018

Related U.S. Application Data

(60) Provisional application No. 62/130,701, filed on Mar. 10, 2015.

(51) Int. Cl.
*B65D 47/24* (2006.01)
*B65D 47/20* (2006.01)
(Continued)

(52) U.S. Cl.
CPC ............. *B65D 47/24* (2013.01); *B65D 47/06* (2013.01); *B65D 47/2068* (2013.01);
(Continued)

(58) Field of Classification Search
CPC ........ B65D 47/24; B65D 47/06; F16K 15/026
See application file for complete search history.

(56) References Cited

U.S. PATENT DOCUMENTS 3,169,267 A 2/1965 Luedtke
4,281,779 A 8/1981 Shepard
(Continued)

FOREIGN PATENT DOCUMENTS

EP 1553046 7/2005
JP H07 257622 10/1995

OTHER PUBLICATIONS

International Search Report and Written Opinion for PCT/US2016/018629.

*Primary Examiner* — Donnell A Long
(74) *Attorney, Agent, or Firm* — Quarles & Brady LLP

(57) ABSTRACT

A valve assembly is configured to be coupled to a fluid container. The valve assembly includes a housing defining a fluid path extending between an inlet and an outlet, and a plunger sub-assembly secured within the fluid path. The plunger sub-assembly includes a retainer secured to the housing within the fluid path, a plunger, and a linear coil spring having a first end secured to the retainer and a second end secured to the plunger. The linear coil spring biases the plunger into the outlet in a closed position. The plunger sealingly closes the outlet in the closed position.

18 Claims, 3 Drawing Sheets

(51) Int. Cl.
  *B65D 47/06*   (2006.01)
  *F16K 15/02*   (2006.01)

(52) U.S. Cl.
  CPC ......... *B65D 47/241* (2013.01); *B65D 47/245* (2013.01); *F16K 15/026* (2013.01)

(56) References Cited

U.S. PATENT DOCUMENTS

| | | | | |
|---|---|---|---|---|
| 5,680,970 A * | 10/1997 | Smith | ............... | B65D 47/248 222/509 |
| 5,794,823 A * | 8/1998 | Roundtree | ........... | B67D 1/1466 222/400.7 |
| 5,906,447 A * | 5/1999 | Horikoshi | .............. | B43K 1/086 401/214 |
| 6,378,742 B1 * | 4/2002 | Rohr | ................... | B67D 1/0835 222/482 |
| 2005/0230414 A1 * | 10/2005 | Yoshida | ............... | B67D 3/0003 222/1 |

* cited by examiner

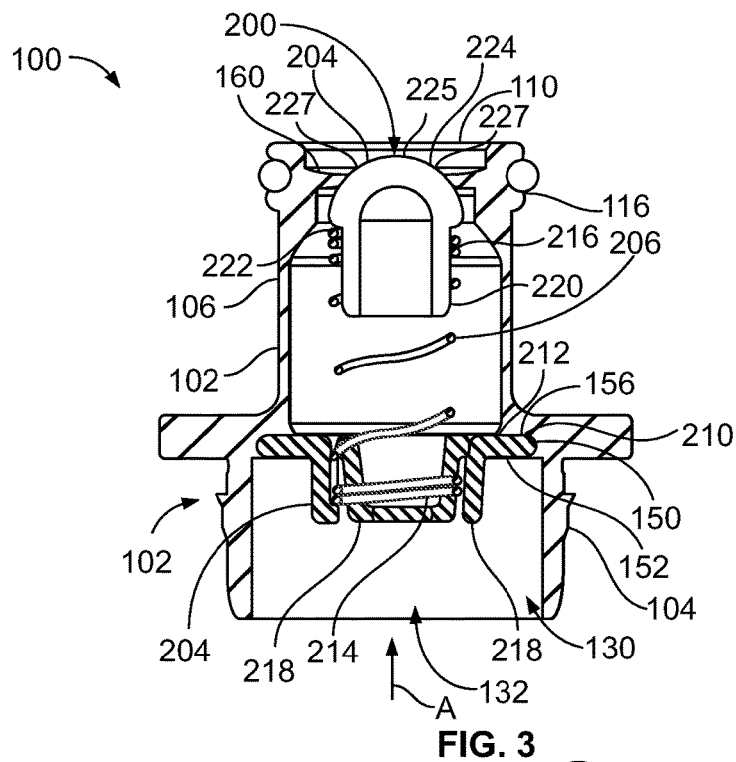
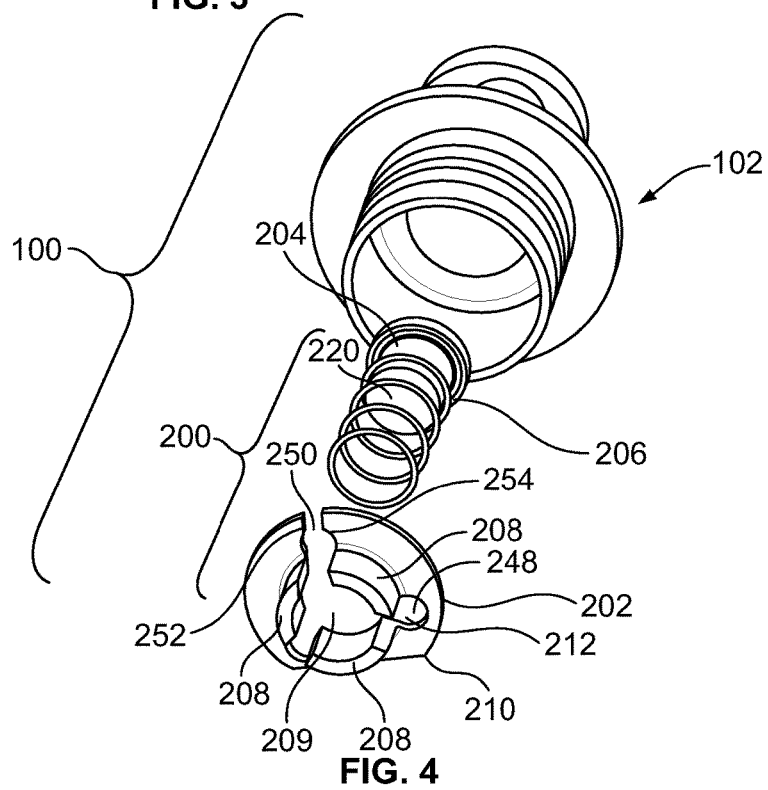

SPRING-BIASED VALVE ASSEMBLY

RELATED APPLICATIONS

This application is a National Phase of International Application No. PCT/US2016/018629, filed Feb. 19, 2016, which relates to and claims priority benefits from U.S. Provisional Patent Application No. 62/130,701 entitled "Valve Assembly," filed Mar. 10, 2015, both of which are hereby incorporated by reference in their entireties.

FIELD OF EMBODIMENTS OF THE DISCLOSURE

Embodiments of the present disclosure generally relate to valve assemblies, and, more particularly, to spring-biased valve assemblies, such as may be coupled to beverage containers.

BACKGROUND

Valves are used in various applications. Certain types of valves may be selectively opened and closed to control flow of a fluid, such as a liquid or gas, therethrough. Check valves, for example, are configured to prevent the flow of fluid in one direction, but, upon exertion of sufficient force, may be moved to allow the flow of fluid in such a direction.

Various valves may be used with respect to beverage containers in order to allow an individual to selectively open and close the containers. When the valve is in the open position, the beverage may be poured out of the container. In the closed position, the valve prevents the beverage from passing through and out of a nozzle of the container.

A known valve includes a housing that retains a conical coil spring that urges a polypropylene ball into a collar that surrounds an opening. An induction welded seal is secured over the opening, and a silicone O-ring is positioned around an outer neck portion of the housing. The seal is configured to be lifted and removed.

It has been found that the conical coil spring is difficult to install into the housing. The conical coil spring is typically manually inserted into the housing. Further, the ball is post-processed to eliminate a parting line flash to provide a reliable seal with respect to the collar. For example, the ball may be connected to the housing through a parting line flash, which is broken to allow the ball to move relative to the housing. As the parting line flash is broken or otherwise removed, portions of the parting line flash may be deposited onto the spring and/or the housing. As such, debris may be deposited within the valve and/or a beverage container to which the valve is secured.

SUMMARY OF EMBODIMENTS OF THE DISCLOSURE

A need exists for an effective valve assembly that may be efficiently manufactured. A need exists for a valve assembly that is less susceptible to debris formation during manufacture.

With those needs in mind, certain embodiments of the present disclosure provide a valve assembly configured to be coupled to a fluid container. The valve assembly may include a housing defining a fluid path extending between an inlet and an outlet, and a plunger sub-assembly secured within the fluid path. The plunger sub-assembly may include a retainer secured to the housing within the fluid path, a plunger, and a linear coil spring having a first end secured to the retainer and a second end secured to the plunger. The linear coil spring biases the plunger into the outlet in a closed position. The plunger sealingly closes the outlet in the closed position. The plunger sub-assembly may be pre-assembled before being secured within the fluid path.

The plunger may include a sealing head and a stem outwardly extending from the sealing head. The second end of the linear coil spring may wrap around at least a portion of the stem. The sealing head may be semispherical.

The retainer may be configured to collapse as the retainer is urged into a secure position within the fluid path. In at least one embodiment, the retainer snapably secures to an undercut formed in the housing. The retainer may include at least one fluid passage offset from an internal channel of the retainer. In at least one embodiment, the retainer may include an annular collar, and a plurality of arcuate base segments extending from the collar. The base segments may be separated by gaps. Further, a separating gap may be formed through the annular collar exposing opposite ends.

Certain embodiments of the present disclosure provide a fluid containment and dispensing system that may include a fluid container including a main body and a nozzle. The fluid container contains a fluid within the main body. A valve assembly is coupled to the fluid container. The valve assembly is configured to be selectively opened and closed. Fluid within the main body is allowed to pass out of the nozzle when the valve assembly is opened. Fluid within the main body is contained within the main body when the valve assembly is closed.

BRIEF DESCRIPTION OF SEVERAL VIEWS OF THE DRAWINGS

FIG. 3 illustrates an axial cross-sectional view of a valve assembly, according to an embodiment of the present disclosure.

FIG. 4 illustrates a perspective bottom exploded view of a valve assembly, according to an embodiment of the present disclosure.

Figure 1:
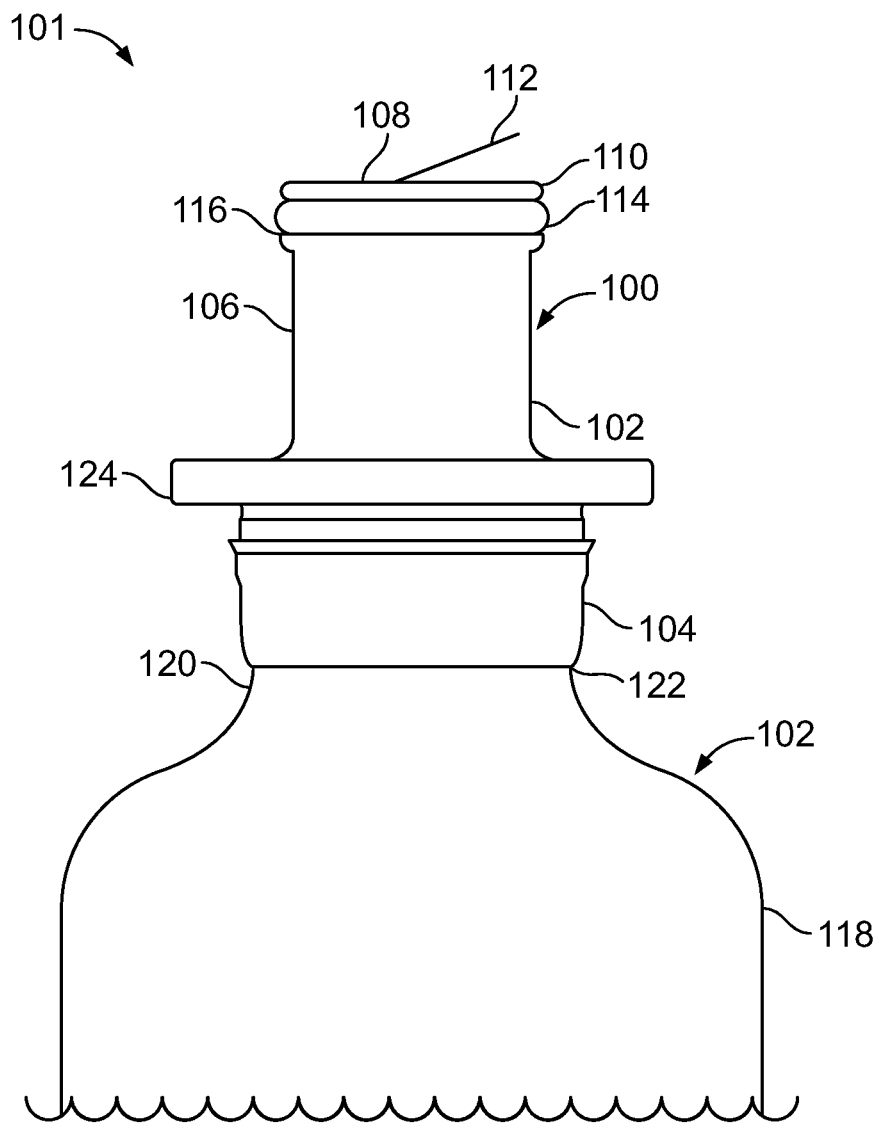
FIG. 1 illustrates a front view of a valve assembly coupled to a fluid container, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a valve assembly that may include a plunger that is spring-biased and held within a housing by a retainer. The plunger and retainer may be formed of a polymer, such as polypropylene, for example. Alternatively, the plunger and retainer may be formed of various other polymers.

A straight coil spring may be used to bias the plunger towards an opening of the housing into a rim surrounding the opening. The plunger may include a stem that connects to an arcuate head, such as a semi-spherical head. A portion of the coil spring winds around the stem and may abut into a rim formed by a proximal portion of the head.

The retainer may be collapsible and configured to snapably secure into the housing. For example, the retainer may be configured to snapably secure into an undercut within the housing.

The retainer may be collapsible in order to compress into position within the housing. As the retainer is urged into the housing, the undercut squeezes the retainer until the top portion passes therethrough, at which point the retainer snaps into place, and the undercut prevents the retainer from retreating.

Unlike the prior known valve, embodiments of the present disclosure do not utilize a conical spring. Instead, the spring is a linear coil spring. The plunger provides a reliable seal with respect to the housing. The retainer may include one or more flow passages that allow for fluid flow therethrough even if the plunger is fully seated with respect to the retainer in a fully compressed position. Further, unlike the prior valve, embodiments of the present disclosure allow for the retainer, spring, and plunger to be sub-assembled.

The valve sub-assembly may be pre-assembled and inserted into the housing. As such, a plunger of the valve sub-assembly is not connected to the housing through a parting line flash (which may otherwise form debris as it is removed).

The linear coil spring does not impinge on the undercut, or otherwise abut into internal surfaces of the housing. Neither the spring, nor the retainer, cause debris to form (such as by disconnecting from a housing at a parting line flash, scraping portions of the housing, and/or the like). Because the valve assembly is less susceptible to debris, the valve assembly may be particularly well-suited for beverage applications. It is to be understood that the valve assembly may be used with various other fluid applications, such as motor oil bottles, washer fluid containers, or various other applications in which a valve is used to selectively close and open a fluid path.

FIG. 1 illustrates a front view of a valve assembly 100 coupled to a fluid container 102, according to an embodiment of the present disclosure. The fluid container 102 and the valve assembly 100 form a fluid containment and dispensing system 101. The valve assembly 100 includes a housing 102 having a coupling neck 104 integrally connected to an outlet tube 106. A seal 108 may be removably secured to an outlet 110 of the outlet tube 106. The seal 108 may be an induction welded seal having a tab 112 that is configured to be grasped by an individual to lift and remove the seal 108 from the outlet 110. An O-ring 114, which may be formed of silicone, is secured around an end 116 of the outlet tube 106 proximate to the outlet 110. The O-ring 114 is configured to sealingly engage an internal surface of a cap (not shown) that may be moveably secured to the valve assembly 100. Optionally, the valve assembly 100 may not include the O-ring 114.

The fluid container 102 may be a bottle, for example, having a main body 118 connected to an outlet nozzle 120. The main body 118 defines an internal chamber (hidden from view) that is configured to retain a liquid (such as a beverage, other fluids, including liquids and gases). The nozzle 120 defines an internal passage (hidden from view) that is in fluid communication with the internal chamber. As such, liquid within the internal chamber of the main body 118 may be poured out of the fluid container 102 through the internal passage of the nozzle 120.

The valve assembly 100 couples to the nozzle 120 of the fluid container 102. The coupling neck 104 securely couples around an exposed end 122 of the nozzle 120. For example, the coupling neck 104 may include an internal threaded interface that threadably secures to an outer threaded interface of the exposed end 122 of the nozzle 120.

In operation, the valve assembly 100 is configured to be engaged to allow for liquid within the fluid container 102 to be selectively poured out of the valve assembly 100. When the valve assembly 100 is in an open position, liquid from the fluid container 102 may pass out of the valve assembly 100. When the valve assembly 100 is in a closed position, the valve assembly 100 prevents liquid from the fluid container 102 from passing out of the outlet 110.

In at least one embodiment, a cap (not shown) may be moveably secured to the end 116 of the outlet tube 106. When the cap is moved into an open position, a portion of the cap may engage a plunger of the valve assembly and press it toward a retainer. As the plunger is pressed, the plunger disconnects from a closed position with a rim of the outlet tube 106, and thereby allows fluid to pass through the outlet 110. When the cap is moved into the closed position, the cap disengages from the plunger, and a linear coil spring of the plunger assembly urges the plunger back into a sealing engagement with the rim of the outlet tube 106, thereby preventing liquid from passing out of the outlet 110.

In at least one other embodiment, a portion of the valve assembly 100, such as an annular rim 124 between the coupling neck 104 and the outlet tube 106, may be actuated to selectively open and close the valve assembly 100. For example, when the annular rim 124 is lifted, rotated, or otherwise moved in a first direction, the movement of the annular rim 124 relative to the plunger sub-assembly (not shown in FIG. 1) may move the valve assembly 100 into an open position. When the annular rim 124 is lifted, rotated, or otherwise moved in a second direction that is opposite the first direction, the movement of the annular rim 124 relative to the plunger assembly may move the valve assembly 100 into a closed position.

In at least one other embodiment, the annular rim 124 may be rotatably coupled to a portion of the plunger sub-assembly. Optionally, other portions of the valve assembly 100 may be moveably coupled to a portion of the plunger assembly in order to move the valve assembly between open and closed positions. In at least one other embodiment, the housing 102 may be operatively coupled to the plunger assembly such that the housing 102 is lifted linearly relative to the plunger assembly to open the valve assembly 100 so that liquid may pass out of the outlet 110.

Figure 2:
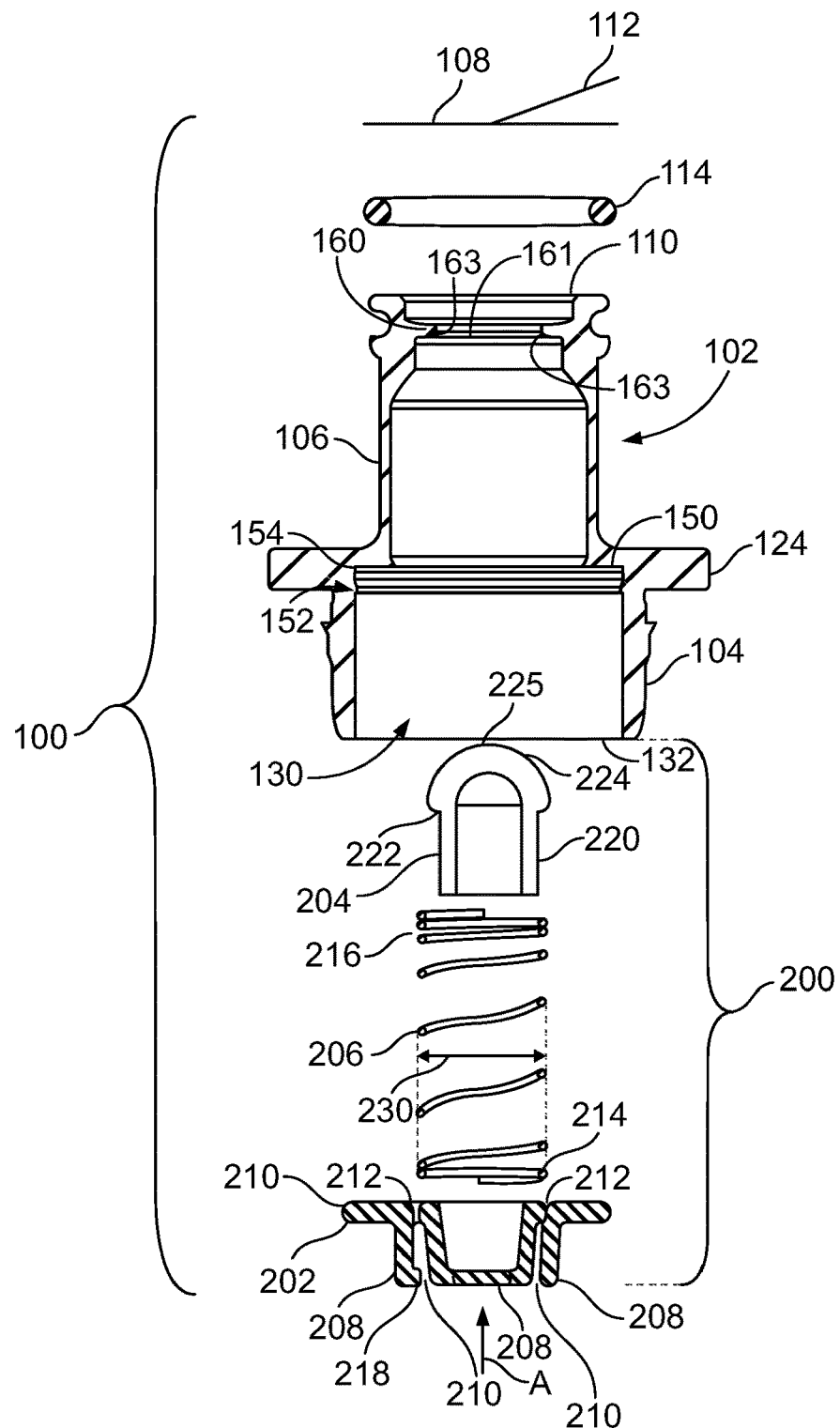
FIG. 2 illustrates an exploded axial cross-sectional view of a valve assembly, according to an embodiment of the present disclosure.

FIG. 2 illustrates an exploded axial cross-sectional view of the valve assembly 100, according to an embodiment of the present disclosure. A fluid path 130 is defined through the housing 102. The fluid path 130 extends from an inlet 132 of the coupling neck 104 to and through the outlet 110 of the outlet tube 106.

The plunger sub-assembly 200 may be pre-assembled before being secured within the fluid path 130. The plunger sub-assembly 200 may include a retainer 202 that couples to a plunger 204 through a coil spring 206. Because the plunger sub-assembly 200 is pre-assembled and then secured to the housing 102, the plunger 204 is not connected to the housing 102 through a parting flash line.

The retainer 202 may include arcuate base segments 208 connected to an annular collar 210. The base segments 208 may be separated by gaps 210, which allow the collar 210 and the base segments 208 to flex inwardly when the retainer 202 is inserted into the housing 102. One or more flow passages or paths 212 (such as channels) may be formed through the collar 210. As shown, the retainer 202 may include three regularly spaced base segments 208. Alternatively, the retainer 202 may include more or less base segments than shown. For example, the retainer 202 may include two regular spaced base segments, or four regularly spaced base segments. In at least one other embodiment, instead of base segments, the retainer 202 may include a contiguous annular base tube, ring, collar, or the like.

The coil spring 206 may be a metal spring having a defined spring constant. The coil spring 206 includes a first end 214 that is configured to couple to the retainer 202, and a second end 216 that is configured to couple to the plunger 204. For example, the first end 214 may be secured between the base segments 208, which may include ledges 218 onto which the first end 214 of the coil spring 206 seats. The second end 216 may wrap around a linear, tubular stem 220 of the plunger 204 and abut into an annular rim 222 of the plunger 204. As such, the coil spring 206 may be compressively captured between the ledges 218 of the base segments 208 and the annular rim 222 of the plunger 204.

The coil spring 206 is a linear spring. For example, an outer diameter 230 of the coil spring 206 is constant throughout, from the first end 214 to the second end 216. The envelope of the coil spring 206 defined by the diameter 230 is constant. As shown, the coil spring 206 does not directly contact interior surfaces of the housing 102.

The plunger 204 includes the stem 220 connected to an arcuate sealing head 224. The stem 220 linearly extends downwardly (as shown in FIG. 2) from the sealing head 224. In at least one embodiment, the sealing head 224 is semispherical. The semispherical sealing head 224 provides a secure sealing connection with the outlet 110. For example, the arcuate, semispherical sealing head 224 extends through a central opening 161 of a rim 160, and provides added sealing surface area with the interior surfaces 163 of the rim 160 that define the opening 161. The sealing head 224 connects to the stem 220 at the annular rim 222.

FIG. 3 illustrates an axial cross-sectional view of the valve assembly 100, according to an embodiment of the present disclosure. Referring to FIGS. 2 and 3, in order to secure the pre-assembled plunger sub-assembly 200 into the fluid path 130 of the housing 102, the plunger sub-assembly 200 is urged into the fluid path 130 through the inlet 132 of the coupling neck 104 in the direction of arrow A.

With continued urging in the direction of arrow A, the collar 210 is urged into an undercut 150 (shown in FIG. 2) formed within the housing 102. The undercut 150 may be proximate to the annular rim 124. The collar 210 may be sized and shaped to be secured within the annular rim 124. The undercut 150 may include a reduced diameter at a receiving end 152. The diameter of the receiving end 152 may be less than the diameter of the collar 210 in an at-rest position. As the collar 210 is urged into the undercut 150 in the direction of arrow A, the receiving end 152 inwardly compresses the collar 210 (which inwardly flexes due to the gaps 210 and/or a separation gap formed in the collar 210). With continued urging in the direction of arrow A, the collar 210 passes into the expanded main portion 154 of the undercut 150, thereby flexing back outwardly to the at-rest position. As such, the collar 210 is securely retained between the reduced diameter of the receiving end 152, and an end wall 156 of the outlet tube 106. In this manner, the retainer 202 is securely connected to the housing 102.

The coil spring 206 urges the plunger 204 into the outlet 110. As shown, the coil spring 206 is compressively captured between the annular rim 222 of the plunger 204 and the ledges 218 of the retainer 202. The linear coil spring 206 biases the plunger 204 into the outlet 110 in a closed position. The plunger sealingly closes the outlet 110 in the closed position. The spring constant of the coil spring 206 forces the plunger 204 towards the outlet 110. The arcuate surface of the sealing head 224 is biased against an inwardly-directed rim 160 proximate to the outlet 110. The rim 160 defines a central opening 161 (shown in FIG. 2) through which a central tip 225 of the sealing head 224 extends, while outer radial portions 227 of the sealing head 224 sealingly abut into interior surfaces 163 of the rim 160. As such, the sealing head 224 seals the outlet 110, thereby preventing liquid from passing out of the outlet 110. The plunger sub-assembly 200 may be selectively actuated between the closed position (as shown in FIG. 3) and an open position in which the sealing head 224 disengages the rim 160, thereby providing a fluid passage therebetween.

As noted above, a cap (not shown) may be moveably secured to the end 116 of the outlet tube 106. When the cap is moved into an open position, a portion of the cap (such as a central post connected to an internal wall through thin beams separated by fluid passages) may be urged into the sealing head 224. As the portion of the cap is urged into the sealing head 224, the sealing head 224 retreats downwardly toward the retainer 202, overcoming the force of the linear coil spring 206. As such, the sealing head 224 disengages the rim 160, and a fluid passage is opened between the rim 160 and the sealing head 224. When the cap is moved into the closed position, the cap disengages from the sealing head 224, and the linear coil spring 206 urges the sealing head 224 back into a sealing engagement with the rim 160, thereby preventing liquid from passing out of the outlet 110.

FIG. 4 illustrates a perspective bottom exploded view of the valve assembly 100, according to an embodiment of the present disclosure. As shown, the fluid passage 212 may be formed through the collar 210 and/or a base segment 208. The fluid passage 212 may be offset from an internal channel 209 of the retainer 202 that is between the base segments 208 and passes through the collar 210. In a fully-seated (or over-seated) position, the stem 220 of the plunger 204 may be disposed within the internal channel 209. Accordingly, the fluid passage 212 is offset from the internal channel 209, and may include an arcuate wall 248 that defines a fluid path therethrough. In the fully-seated (or over-seated) position, the stem 220 is not disposed within the fluid passage 212. Therefore, the fluid passage 212 allows fluid to pass through the retainer 202 even if the stem 220 of the plunger 204 is fully seated within the retainer 202 (such as against the ledges 218).

The retainer 202 may include more than one fluid passage 212 offset from the internal channel 209. Further, each fluid passage 212 may be or include an opening formed through the collar 210 radially away from the internal channel 209. Alternatively, the retainer 202 may not include the fluid passage 212.

Additionally, a separating gap 250 may be formed through the collar 210, thereby exposing opposite ends 252 and 254. The separating gap 250 promotes easier inward collapsing as the retainer 202 is inserted into the housing 102, as described above. Alternatively, the retainer 202 may not include the separating gap 250.

Referring to FIGS. 1-4, the plunger sub-assembly 200 may be pre-assembled before being secured within the housing 102. Alternatively, the plunger 204 and/or the retainer 202 may be integrally molded and formed with the housing 102.

The plunger 204 is spring-biased and held within the housing 102 by the retainer 202. The straight, linear coil spring 206 biases the plunger 204 towards the outlet 110 of the housing into the rim 160. The plunger 204 may include the stem 220 that connects to the arcuate sealing head 224. A portion of the coil spring 206 winds around the stem 220 and abuts into the rim 222, which may be formed by a proximal portion of the sealing head 224.

The retainer 202 may be collapsible and configured to snapably secure into the housing 102. For example, the undercut 150 within the housing 102 may be configured to cooperate with the retainer 202 to provide a snapable engagement therebetween.

The retainer 202 may be collapsible in order to compress it into position within the housing 102. As the retainer 202 is urged into the housing 102, the undercut 150 squeezes the retainer 202 until the top portion passes through a reduced diameter portion of the undercut 150, at which point the retainer 202 snaps into place, and the undercut 150 prevents the retainer from retreating.

Unlike the prior known valve, embodiments of the present disclosure do not utilize a conical spring. Instead, the spring is a linear coil spring. The plunger 204 provides a reliable seal with respect to the housing 102. The retainer 202 may include one or more flow paths 212 that allow for fluid flow therethrough even if the plunger 204 is fully seated against the retainer 202. Further, unlike the prior known valve, embodiments of the present disclosure allow for the retainer 202, the spring 206, and the plunger 204 to be pre-assembled as the plunger sub-assembly 200.

In at least one embodiment, the linear coil spring 206 does not impinge on the undercut 150, as the collar 210 is securely trapped within the undercut 150. Further, the plunger 204 is not initially connected to the housing through a parting flash line. Therefore, the valve assembly 100 is less susceptible to debris formation and deposition (as compared to the prior known valve), and is particularly well-suited for beverage applications.

Embodiments of the present disclosure provide an effective valve assembly that may be efficiently manufactured. For example, the plunger sub-assembly 100 may be pre-assembled and inserted into the housing 102.

Further, embodiments of the present disclosure provide a valve assembly that is less susceptible to debris formation and deposition during manufacture. For example, the linear coil spring 206 does not abut into internal walls of the housing 102, unlike a conical coil spring. Further, the plunger 204 is not initially connected to the housing 102 through a parting flash line, which is configured to be broken.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A valve assembly configured to be coupled to a fluid container, the valve assembly comprising:
   a housing defining a fluid path extending between an inlet and an outlet; and
   a plunger sub-assembly secured within the fluid path, wherein the plunger sub-assembly comprises:
   (a) a retainer secured to the housing within the fluid path, wherein the retainer comprises a plurality of arcuate base segments extending from an annular collar, wherein the plurality of base segments are separated by gaps;
   (b) a plunger; and
   (c) a linear coil spring having a first end secured to the retainer and a second end secured to the plunger, wherein the linear coil spring biases the plunger into the outlet in a closed position, and wherein the plunger sealingly closes the outlet in the closed position.

2. The valve assembly of claim 1, wherein the plunger sub-assembly is pre-assembled before being secured within the fluid path.

3. The valve assembly of claim 1, wherein the plunger comprises a sealing head and a stem outwardly extending from the sealing head.

4. The valve assembly of claim 3, wherein the second end of the linear coil spring wraps around at least a portion of the stem.

5. The valve assembly of claim 3, wherein the sealing head is semispherical.

6. The valve assembly of claim 1, wherein the retainer snapably secures to an undercut formed in the housing.

7. The valve assembly of claim 1, wherein the retainer comprises at least one fluid passage offset from an internal channel of the retainer.

8. The valve assembly of claim 1, wherein a separating gap is formed through the annular collar exposing opposite ends.

9. The valve assembly of claim 1, wherein the retainer is configured to collapse as the retainer is urged into a secure position within the fluid path.

10. A fluid containment and dispensing system comprising:
    a fluid container including a main body and a nozzle, wherein the fluid container contains a fluid within the main body; and a valve assembly coupled to the fluid container, wherein the valve assembly is configured to selectively be opened and closed, wherein fluid within the main body is allowed to pass out of the nozzle when the valve assembly is opened, and wherein fluid within the main body is contained within the main body when the valve assembly is closed, the valve assembly comprising:

a housing defining a fluid path extending between an inlet and an outlet; and a plunger sub-assembly secured within the fluid path, wherein the plunger sub-assembly comprises:

(a) a retainer secured to the housing within the fluid path, wherein the retainer comprises a plurality of arcuate base segments extending from an annular collar, wherein the plurality of base segments are separated by gaps;

(b) a plunger; and (c) a linear coil spring having a first end secured to the retainer and a second end secured to the plunger, wherein the linear coil spring biases the plunger into the outlet in a closed position, and wherein the plunger sealingly closes the outlet in the closed position.

11. The fluid containment and dispensing system of claim 10, wherein the plunger sub-assembly is pre-assembled before being secured within the fluid path.

12. The fluid containment and dispensing system of claim 10, wherein the plunger comprises a sealing head and a stem outwardly extending from the sealing head.

13. The fluid containment and dispensing system of claim 12, wherein the second end of the linear coil spring wraps around at least a portion of the stem, and wherein the sealing head is semispherical.

14. The fluid containment and dispensing system of claim 10, wherein the retainer snapably secures to an undercut formed in the housing.

15. The fluid containment and dispensing system of claim 10, wherein the retainer comprises at least one fluid passage offset from an internal channel of the retainer.

16. The fluid containment and dispensing system of claim 10, wherein a separating gap is formed through the annular collar exposing opposite ends.

17. The fluid containment and dispensing system of claim 10, wherein the retainer collapses as the retainer is urged into a secure position within the fluid path.

18. A valve assembly configured to be coupled to a fluid container, the valve assembly comprising:

a housing defining a fluid path extending between an inlet and an outlet; and a plunger sub-assembly secured within the fluid path, wherein the plunger sub-assembly comprises:

(a) a retainer secured to the housing within the fluid path, wherein the retainer is configured to collapse as the retainer is urged into a secure position within the fluid path, wherein the retainer snapably secures to an undercut formed in the housing, wherein the retainer comprises: (i) at least one fluid passage offset from an internal channel of the retainer, (ii) an annular collar, wherein a separating gap is formed through the annular collar exposing opposite ends, and a (iii) plurality of arcuate base segments extending from the collar, wherein the plurality of base segments are separated by gaps;

(b) a plunger, wherein the plunger comprises a semispherical sealing head and a stem outwardly extending from the sealing head; and (c) a linear coil spring having a first end secured to the retainer and a second end secured to the plunger, wherein the second end of the linear coil spring wraps around at least a portion of the stem, wherein the linear coil spring biases the plunger into the outlet in a closed position, wherein the plunger sealingly closes the outlet in the closed position, wherein the plunger sub-assembly is pre-assembled before being secured within the fluid path.

* * * * *